(12) United States Patent
Ito

(10) Patent No.: US 6,181,480 B1
(45) Date of Patent: Jan. 30, 2001

(54) MICROSCOPE OBJECTIVE

(75) Inventor: Itoe Ito, Yokohama (JP)

(73) Assignee: Nikon Corporation, Tokyo (JP)

( * ) Notice: Under 35 U.S.C. 154(b), the term of this patent shall be extended for 0 days.

(21) Appl. No.: 09/362,379

(22) Filed: Jul. 28, 1999

(30) Foreign Application Priority Data

Jul. 29, 1998 (JP) .................................................. 10-227524
Jul. 27, 1999 (JP) .................................................. 11-212386

(51) Int. Cl.$^7$ .................................................. G02B 21/02
(52) U.S. Cl. ........................... 359/656; 359/657; 359/658
(58) Field of Search .................... 359/660, 659, 359/658, 657, 656

(56) References Cited

U.S. PATENT DOCUMENTS 3,746,428 * 7/1973 Shoemaker ........................... 350/214
5,121,255 * 6/1992 Hayashi ................................. 359/656

FOREIGN PATENT DOCUMENTS 572482    3/1993 (JP) ................................ G02B/21/02

* cited by examiner

Primary Examiner—Georgia Epps
Assistant Examiner—Tim Thompson

(57) ABSTRACT

A microscope objective that is achromatic, so that deviations in focus do not arise with visible light and ultraviolet light (particularly light in the vicinity of wavelength=266 nm), and which can satisfactorily observe a specimen. The microscope objective is made of at least three types of glass materials, of which one type is barium fluoride.

8 Claims, 5 Drawing Sheets

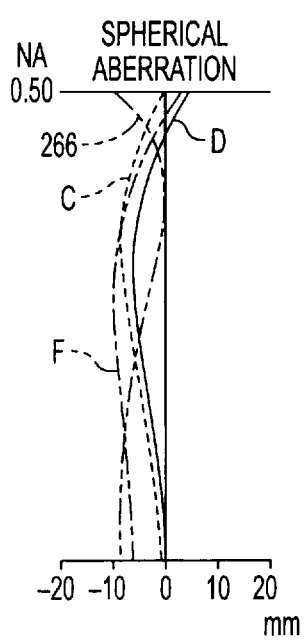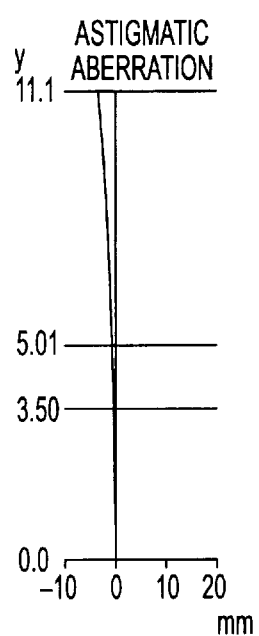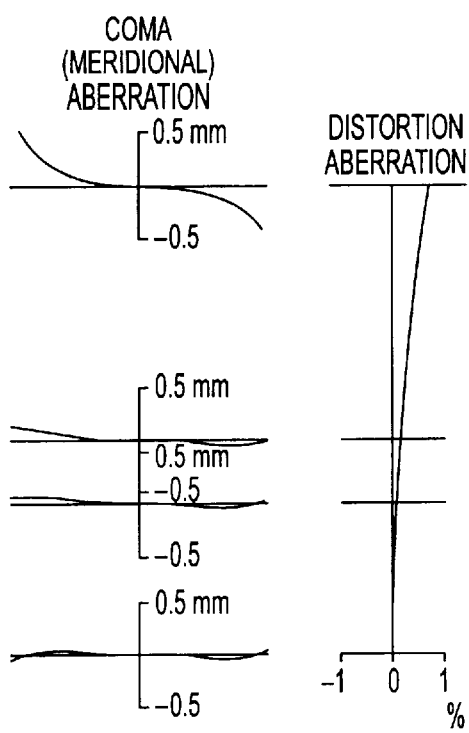
FIG. 2A  FIG. 2B  FIG. 2C  FIG. 2D

MICROSCOPE OBJECTIVE

BACKGROUND OF THE INVENTION

1. Field of the Invention

The present invention relates to a microscope objective, and more particularly relates to a microscope objective that uses visible light and ultraviolet light.

2. Description of the Related Art

In recent years, specimens have not only been observed by illumination with visible light in the wavelength region of approximately 400 to 750 nm, but they have also been observed and processed by illumination with light of short wavelengths, such as ultraviolet light.

In viewing specimens through a microscope it is important to correct chromatic aberration simultaneously for both visible light and ultraviolet light in an objective of a microscope that observes a specimen using visible light and ultraviolet light in combination. This correction is called achromatism. However, there is a limited number of glass materials available that satisfy the achromatism condition for visible light and ultraviolet light. Consequently, even though a so-called parfocal length is increased to achieve achromatism, there is a problem in that chromatic aberration cannot be sufficiently corrected.

SUMMARY OF THE INVENTION

It is an object of this invention to overcome the above problems, and an object to provide a microscope objective that is achromatic, so that deviations in focus do not arise with visible light and ultraviolet light (particularly light in the vicinity of wavelength 266 nm), and which can satisfactorily observe a specimen.

BRIEF DESCRIPTION OF THE DRAWINGS

These and other objects and advantages of the invention will become apparent and more readily appreciated for the following description of the preferred embodiments, taken in conjunction with the accompanying drawings of which:

FIGS. 2A to 2D illustrates aberration plots of the lens according to the first embodiment for carrying out the present invention.

DETAILED DESCRIPTION OF THE PREFERRED EMBODIMENTS

Figure 1:
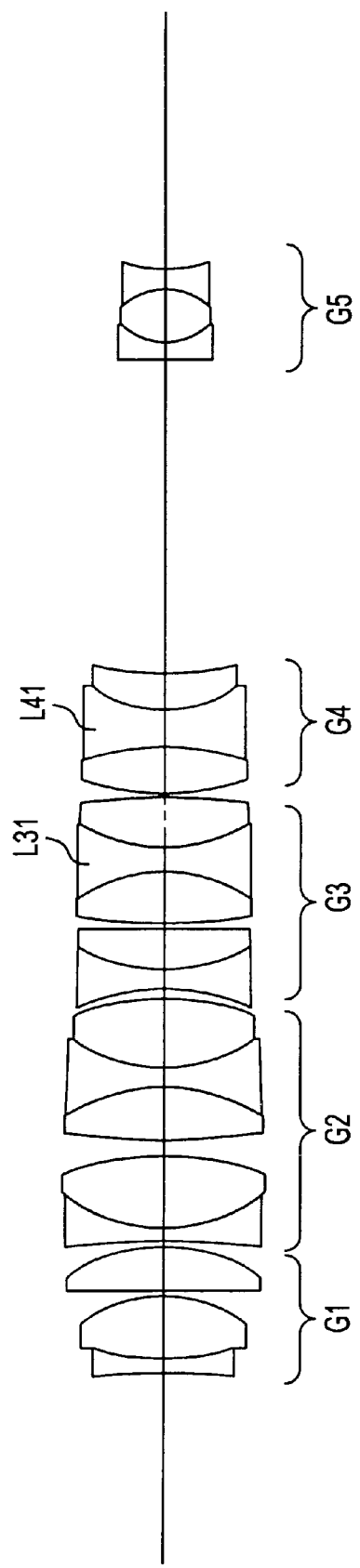
FIG. 1 illustrates the lens configuration of the first embodiment for carrying out the present invention.

Reference will now be made in detail to the preferred embodiments of the present invention, examples of which are illustrated in the accompanying drawings, wherein like reference numerals refer to like elements throughout. In accordance with the preferred embodiments of the invention there is provided a microscope objective solving the above mentioned problems by providing a microscope objective made of at least three types of glass materials, of which one type is barium fluoride.

Furthermore, the present invention is preferably a microscope objective, includes, objectwise to imagewise: first lens group G1 having a cemented lens and having positive refractive power; second lens group G2 having a cemented lens and having positive refractive power; third lens group G3 having a cemented lens group and having negative refractive power; fourth lens group G4 having positive refractive power; and fifth lens group G5 having negative refractive power.

In addition, the present invention is preferably a microscope objective that satisfies each of the following conditions: (1) $1.5 < |f1/F| < 5$; (2) $5 < |f3/F| < 15$; (3) $3 < |f4/F| < 45$; (4) $1 < |f5/F| < 10$; and (5) $(W \times h)/(l \times F) > 0.015$), wherein, F is the focal length of the entire microscope objective system, f1 is the focal length of the first lens group, f3 is the focal length of the third lens group, f4 is the focal length of the fourth lens group, f5 is the focal length of the fifth lens group, W is the working distance of the microscope objective, h is the maximum height of the principal ray that enters the lens most objectwise, and l is the parfocal length.

The microscope objective according to preferred embodiments of the present invention uses glass materials having a high transmittance with respect to a visible light wavelength of approximately 400 to 750 nm, and ultraviolet light wavelength of approximately 266 nm. In addition, at least three types of glass materials are used in order to achieve achromatism with respect to both lights, one type of glass material among these being barium fluoride ($BaF_2$). Furthermore, since barium fluoride is highly deliquescent, it is preferable to use a lens that does not contact air inside the cemented lens. Examples of preferred glass materials besides barium fluoride include quartz, fluorite and lithium fluoride.

The aforementioned condition (1) specifies the condition for reducing secondary dispersion while maintaining an appropriate relationship between the numerical aperture and the working distance. If $|f1/F|$ exceeds the upper limit in condition (1), it adversely degrades the balance of secondary dispersion over the entire microscope objective system. Conversely, if $|f1/F|$ falls below the lower limit in condition (1), first lens group G1 exceeds the limit in which chromatic aberration can be corrected; consequently, the shape of the other lens groups G2 to G5 changes, and chromatic aberration cannot be satisfactorily corrected. Furthermore, even better results maybe obtained by setting the upper limit to 3.2.

Condition (2) specifies an appropriate range for the focal length of third lens group G3. If $|f3/F|$ exceeds the upper limit in condition (2), secondary dispersion increases, the effect of using a glass material having a high refractive index in third lens group G3 is lost, and chromatic aberration cannot be sufficiently corrected. Conversely, if $|f3/F|$ falls below the lower limit in condition (2), aberrations can no longer be corrected by fifth lens group G5 as one group, since the secondary dispersion, which includes the refractive index differential of third lens group G3, adversely increases in a reverse direction compared to when $|f3/F|$ exceeds the upper limit.

Condition (3) specifies an appropriate range for the focal length of fourth lens group G4. If $|f4/F|$ exceeds the upper limit in condition (3), secondary dispersion increases, the effect of using a glass material having a high refractive index in fourth lens group G4 is lost and chromatic aberration cannot be sufficiently corrected. Conversely, if $|f4/F|$ falls below the lower limit in condition (3), secondary dispersion, including the refractive index differential of fourth lens group G4, exceeds the capability to be reduced, and therefore aberrations cannot be corrected by the subsequent lens group.

Condition (4) specifies an appropriate range for the focal length of fifth lens group G5, and is a condition for arranging the balance of achromatism of the entire microscope objective system. If $|f5/F|$ exceeds the upper limit in condition (4), chromatic aberration is undercorrected. Conversely, if $|f5/F|$ falls below the lower limit in condition (4), chromatic aberration is overcorrected.

Condition (5) describes the relationship between the parfocal length, N.A. and the working distance. The interchangeability of an objective with other objectives in a microscope is improved by being parfocal. By increasing the parfocal length, the working distance can also be lengthened. If (W×h)/(l×F) falls below the lower limit in condition (5), the working distance or N.A. is reduced.

In addition, embodiments of the present invention are preferably directed toward a microscope objective, wherein at least one cemented lens in third lens group G3 and in fourth lens group G4 is a cemented lens that has, objectwise to imagewise, a first lens element, second lens element L31 or L41, and a third lens element.

In addition, the present invention preferably satisfies each of the following conditions: (6) 1.45<n; and (7) 70<v<90, wherein, n is the refractive index with respect to the d-line (X=587.56 nm) of the second lens element L31 or L41, and v is the Abbe number.

Condition (6) specifies an appropriate range for the refractive index of second lens element L31 or L41, for reducing secondary dispersion. If n falls below the lower limit in condition (6), the refractive index differential at the cemented surface of the cemented lens unfortunately decreases, and secondary dispersion cannot be reduced.

Condition (7) specifies an appropriate range for the Abbe number of second lens element L31 or L41, also for reducing secondary dispersion. If v falls below the lower limit or if v exceeds the upper limit in condition (7), chromatic aberration cannot be sufficiently corrected.

Table 1 and Table 2 list the specifications of the microscope objective according to embodiments of the present invention. In both tables, f is the focal length, N.A. is the numerical aperture, B is the magnification, and W.D. is the working distance. In addition, the Surface No. is representative of the objectwise order of the lens surface, r is the radius of curvature, d is the lens surface spacing, vd is the Abbe number, and nd is the refractive index with respect to the d-line (λ=587.56 nm).

FIGS. 2A to 2D and FIGS. 4A to 4D illustrate aberration plots of the microscope objective according to embodiments of the present invention. In the spherical aberration plots, C is the C-line (λ=656.28 nm), D is the d-line (λ=587.56 nm), F is the F-line (λ=486.13 nm), and 266 is the aberration with respect to a ray having a wavelength of λ=266 nm. In addition, the astigmatism plots, coma plots and distortion plots are with respect to the d-line; in the astigmatism plots, the solid line is the sagittal image plane, and the broken line is the meridional image plane.

FIG. 1 illustrates the configuration of the microscope objective according to a first embodiment of the present invention. Therein, at least one cemented lens in third lens group G3 is a cemented lens including, objectwise to imagewise, a first lens element, lens element L31 (barium fluoride) and a third lens element. Furthermore, at e cemented lens in fourth lens group G4 is a cemented lens including, se to imagewise, a first lens element, second lens element L41 (barium and a third lens element.

TABLE 1

| Surface No. | r | d | vd | nd | |
|---|---|---|---|---|---|
| 1 | −24 | 0.9 | 67.8 | 1.45850 | G1 |
| 2 | 15 | 3.3 | 95.2 | 1.43385 | |
| 3 | −7.4 | 0.2 | | | |
| 4 | −100 | 2.4 | 95.2 | 1.43385 | |

TABLE 1-continued

| Surface No. | r | d | vd | nd | | |
|---|---|---|---|---|---|---|
| 5 | −9.5 | 0.2 | | | | |
| 6 | −124.5 | 0.9 | 67.8 | 1.45850 | G2 | |
| 7 | 9.8 | 3.7 | 95.2 | 1.43385 | | |
| 8 | −16.8 | 0.8 | | | | |
| 9 | 4.0 | 2.9 | 95.2 | 1.43385 | | |
| 10 | −10 | 1 | 67.8 | 1.45850 | | |
| 11 | 9.7 | 3.5 | 95.2 | 1.43385 | | |
| 12 | −15 | 0.7 | | | | |
| 13 | −12 | 1 | 67.8 | 1.45850 | G3 | |
| 14 | 10.5 | 2.2 | 95.2 | 1.43385 | | |
| 15 | 100 | 0.2 | | | | |
| 16 | 33 | 2.7 | 95.2 | 1.43385 | | |
| 17 | −9.8 | 1.4 | 81.6 | 1.47460 | | L31 |
| 18 | 10.5 | 2.5 | 95.2 | 1.43385 | | |
| 19 | −41.3 | 0.2 | | | | |
| 20 | 14 | 2.6 | 95.2 | 1.43385 | G4 | |
| 21 | −14.8 | 1.9 | 81.6 | 1.47460 | | L41 |
| 22 | 7 | 2 | 67.8 | 1.45850 | | |
| 23 | 20 | 16.7 | | | | |
| 24 | 900 | 1 | 95.2 | 1.43385 | G5 | |
| 25 | 4.1 | 2.8 | 67.8 | 1.45850 | | |
| 26 | −4.1 | 1 | 95.2 | 1.43385 | | |
| 27 | 7.2 | | | | | | f = 4 mm
N. A. = 0.5
B = −50X
W. d = 5 mm
Values Corresponding to Conditions (1)–(7)
(1) f1/F = 3.0
(2) f3/F = 9.2
(3) f4/F = 40.1
(4) f5/F = 5.4
(5) (W × h)/(I × F) = 0.06
(6) n = 1.47460
(7) v = 81.6

FIGS. 2A to 2D shows the various aberrations of the microscope objective according to the first embodiment of the present invention. As is clear from the drawings, the various aberrations are satisfactorily corrected.

Figure 3:
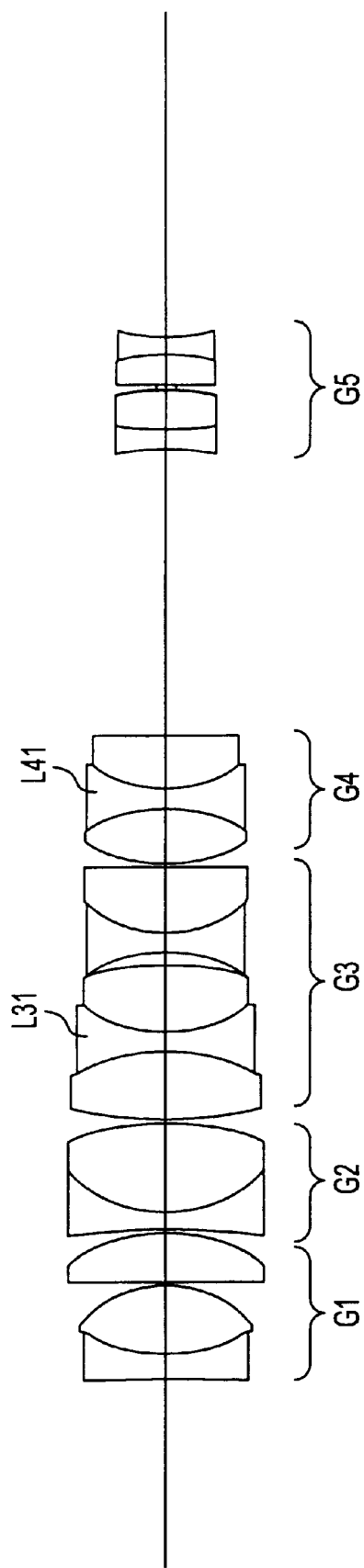
FIG. 3 illustrates the lens configuration of the second embodiment for carrying out the present invention.
Figure 4A:
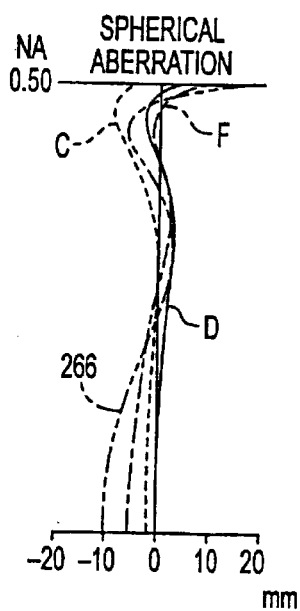
FIGS. 4A to 4D illustrates aberration plots of the lens according to the second embodiment for carrying out the present invention.
Figure 4B:
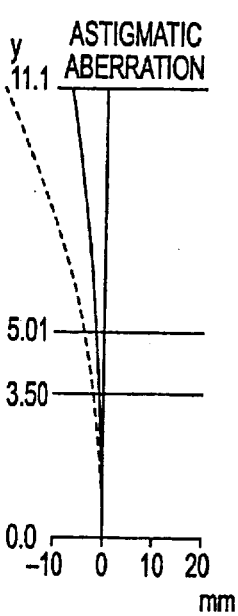
Figure 4C:
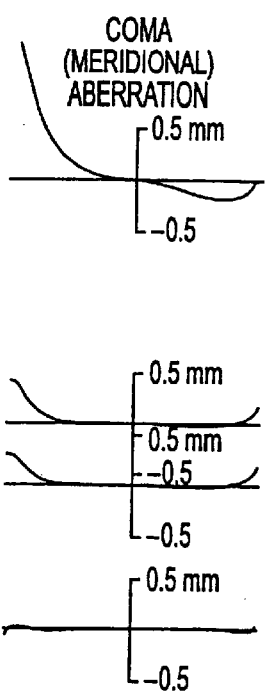
Figure 4D:
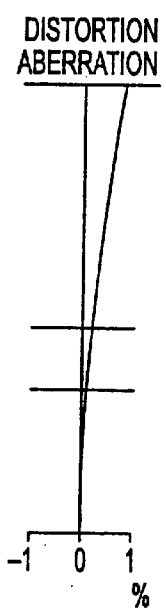

FIG. 3 shows the configuration of the microscope objective according to a second embodiment of the present invention. Therein, at least one cemented lens in third lens group G3 is a cemented lens having, objectwise to imagewise, a first lens element, second lens element L31 (barium fluoride) and a third lens element. Furthermore, at least one cemented lens in fourth lens group G4 is a cemented lens having, objectwise to imagewise, a first lens element, second lens element L41 (barium fluoride) and a third lens element. Table 2 lists the various specifications of the microscope objective according to the second embodiment.

TABLE 2

| Surface No. | r | d | vd | nd | | |
|---|---|---|---|---|---|---|
| 1 | −64.8 | 1.2 | 67.8 | 1.45850 | G1 | |
| 2 | 9.1 | 3.3 | 95.2 | 1.43385 | | |
| 3 | −6.6 | 0.2 | | | | |
| 4 | −150.8 | 2.5 | 95.2 | 1.43385 | | |
| 5 | −9.8 | 0.2 | | | | |
| 6 | 45.1 | 1 | 67.8 | 1.45850 | G2 | |
| 7 | 7.6 | 4.5 | 95.2 | 1.43385 | | |
| 8 | −16.1 | 0.2 | | | | |
| 9 | 24.2 | 3.5 | 95.2 | 1.43385 | G3 | |
| 10 | −10.9 | 1 | 81.6 | 1.47460 | | L31 |
| 11 | 7.6 | 3.4 | 95.2 | 1.43385 | | |
| 12 | −17.0 | 0.7 | | | | |
| 13 | −8.4 | 1 | 67.8 | 1.45850 | | |
| 14 | 6.4 | 2.5 | 95.2 | 1.43385 | | |
| 15 | 80.2 | 0.2 | | | | |

TABLE 2-continued

| Surface No. | r | d | vd | nd | | |
|---|---|---|---|---|---|---|
| 16 | 8.9 | 2.8 | 95.2 | 1.43385 | G4 | |
| 17 | −9.3 | 1.0 | 81.6 | 1.47460 | | L41 |
| 18 | 6.9 | 2.7 | 95.2 | 1.43385 | | |
| 19 | −43.2 | 14.8 | | | | |
| 20 | −15.7 | 1 | 95.2 | 1.43385 | G5 | |
| 21 | −18.8 | 2 | 67.8 | 1.45850 | | |
| 22 | −11.1 | 0.2 | | | | |
| 23 | −31.8 | 1.5 | 67.8 | 1.45850 | | |
| 24 | 9.8 | 1 | 95.2 | 1.43385 | | |
| 25 | 9 | | | | | | f = 4 mm
N. A. = 0.5
B = −50X
W. D = 5 mm
Values Corresponding to Conditions (1)–(7)
(1) f1/F = 2.5
(2) f3/F = 10.0
(3) f4/F = 7.9
(4) f5/F = 5.5
(5) (W × h)/(I × F) = 0.06
(6) n = 1.47460
(7) v = 81.6

FIGS. 4A to 4D illustrates the various aberrations of the microscope objective according to the second embodiment. As is clear from the drawings, the various aberrations are satisfactorily corrected.

Figure 5:
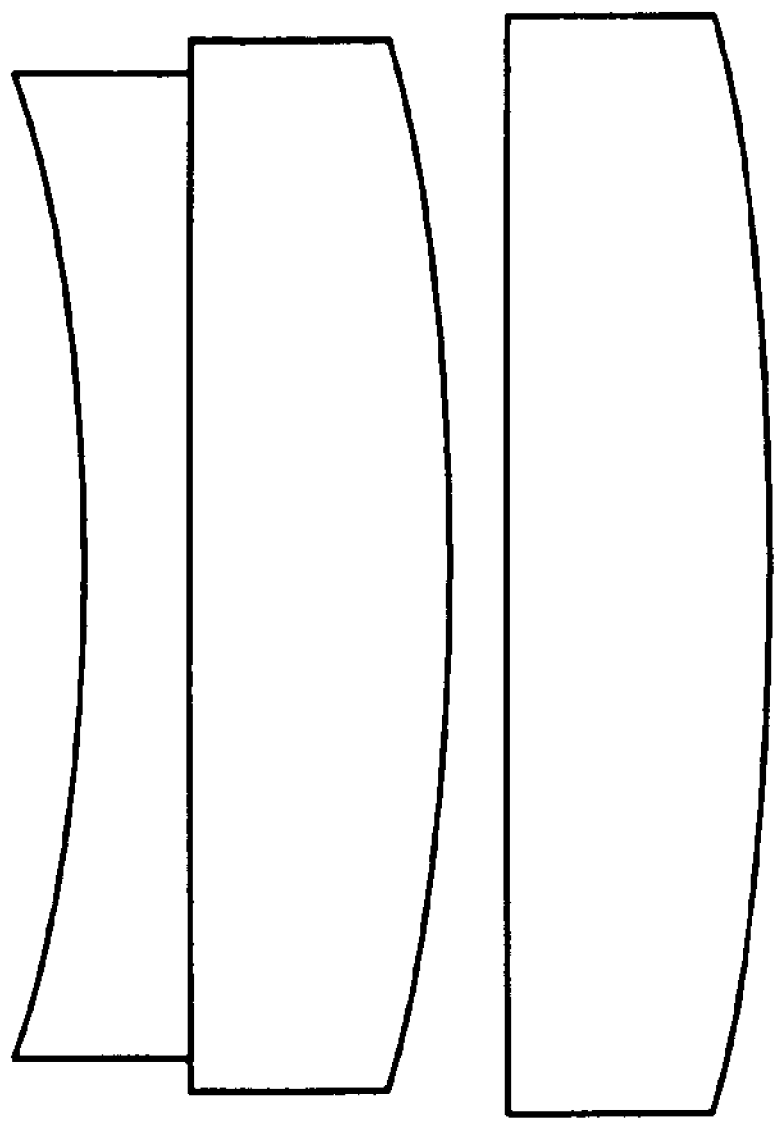
FIG. 5 illustrates the configuration of the imaging lens.

In addition, the microscope objective according to another embodiment is an infinity-corrected lens, and is used in combination with the imaging lens described by the specifications in Table 3 below, with a spacing of approximately 150 mm. In addition, FIG. 5 shows the configuration of the imaging lens.

TABLE 3

| Surface No. | r | d | vd | nd |
|---|---|---|---|---|
| 1 | −30.63 | 2.0 | 67.8 | 1.4585 |
| 2 | 2406.20 | 5.0 | 95.2 | 1.4339 |
| 3 | −39.06 | 1.0 | | |
| 4 | −417.39 | 5.0 | 95.2 | 1.4339 |
| 5 | −51.92 | | | |

As explained above, the microscope objective of the present invention has a magnification on the order of 50×, is sufficiently corrected for chromatic aberration with respect to visible light and light in the vicinity of a wavelength of 266 nm and has a sufficiently long working distance W.D. with respect to numerical aperture N.A.; more particularly, a semiachromatic microscope objective can be provided.

Glossary of Symbols

G1: First lens group
G2: Second lens group
G3: Third lens group
G4: Fourth lens group
G5: Fifth lens group
L31: Second lens element of the cemented lens of third lens group G3
L41: Second lens element of the cemented lens of fourth lens group G4

What is claimed is:

1. An objective made of at least three types of glass materials, of which one type is barium fluoride, comprising:
a cemented lens having, objectwise to imagewise,
a first lens element,
a second lens element made of barium fluoride, and
a third lens element.

2. The objective according to claim 1, comprising, objectwise to imagewise:
a first lens group having a cemented lens and having positive refractive power;
a second lens group having a cemented lens and having positive refractive power;
a third lens group having a cemented lens group and having negative refractive power;
a fourth lens group having positive refractive power; and
a fifth lens group having negative refractive power.

3. A microscope objective comprising:
at least three types of glass materials, of which one type is barium fluoride;
a sequence of lens groups, objectwise to imagewise, having
a first lens group having a cemented lens and a positive refractive power;
a second lens group having a cemented lens and a positive refractive power;
a third lens group having a cemented lens group and a negative refractive power;
a fourth lens group with a positive refractive power; and
a fifth lens group with a negative refractive power
wherein the microscope objective satisfies the following condition:

$$1.5<|f1/F|<5,$$

wherein, F is the focal length of the entire said microscope objective, and f1 is the focal length of said first lens group.

4. The microscope objective according to claim 3, satisfying the following condition:

$$5<|f3/F|<15,$$

wherein, f3 is the focal length of said third lens group.

5. The microscope objective according to claim 4, satisfying the following condition:

$$3<|f4/F|<45,$$

wherein, f4 is the focal length of said fourth lens group.

6. The microscope objective according to claim 5, satisfying the following condition:

$$1<|f5/F|<10,$$

wherein, f5 is the focal length of said fifth lens group.

7. The microscope objective according to claim 6, satisfying the following condition:

$$(W \times h)/(l \times F)>0.01,$$

wherein, W is the working distance of said microscope objective, h is the maximum height of the principal ray that enters the lens most objectwise, and l is the parfocal length.

8. The microscope objective according to claim 2, wherein at least one said cemented lens in said third lens group and in said fourth lens group is a cemented lens that comprises, objectwise to imagewise, first, second and third lens elements.

* * * * *